Dec. 3, 1929.  J. J. GILBERT  1,738,292

SUBMARINE DUPLEX TELEGRAPH SYSTEM

Filed Dec. 17, 1927

INVENTOR:
JOHN J. GILBERT
By J. W. Schmied
ATTORNEY

Patented Dec. 3, 1929

1,738,292

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

SUBMARINE DUPLEX TELEGRAPH SYSTEM

Application filed December 17, 1927. Serial No. 240,691.

The invention relates to submarine telegraph signaling systems, and more particularly to terminal sections arranged for duplex operation over submarine cables.

An object of the invention is to neutralize the disturbing effects due to extraneous electric waves picked up by the cable and at the same time to balance the effects in the cable arising from the non-linear magnetic characteristic of the loading material without excessively shunting the received signaling current.

According to the present invention the object is attained by balancing against the main cable a similar cable of comparatively short length, laid parallel to or armored with the main cable and terminating in an artificial line having practically the same electrical characteristics as that part of the main cable beyond the short cable, and by employing for the impedance arms of the duplex bridge, the main cable, the balanced sea earth return cable, and two artificial lines having impedances which are in approximately the same ratio as the impedances of the main cable and the balancing or sea earth return cable, respectively, and connecting the receiving and transmitting apparatus so as to form a Wheatstone bridge. Located at intervals in the conductor common to the artificial lines are impedances simulating the coupling between the main cable and the sea earth return cable. By means of these artificial lines provision is made to establish a complete and accurate balance for duplex operation.

The limiting speed of signaling over long submarine telegraph cables is in most cases determined by interference arising either from lack of perfect duplex balance or from external sources. That which arises from lack of perfect duplex balance could, of course, be reduced by more carefully matching the artificial line to the cable, but in the systems at present commonly used, an accurate balance, even if obtained at one time, cannot be maintained for long since temperature changes may affect the electrical constants of the cable, rendering the balance imperfect.

The interference from external sources may arise either from neighboring power circuits, or may come from natural sources. One method which has been employed to reduce the external interference is to make the ground connection of the balancing artificial line to a second conductor called the sea earth conductor which runs parallel to the main cable conductor usually in the same sheath to a point several miles from shore where a ground connection is made to the cable sheath. This sea earth conductor generally has the same electrical constants as the main cable conductor and, in order to completely eliminate the effect of external interference, the sea earth conductor is extended out to a point sufficiently far from the receiving station that no sensible disturbance is received beyond such point. Here the sea earth return conductor is terminated in an artificial line having substantially the same impedance as the cable conductor extending from this point to the distant station. With a preferred form of main cable, such as one comprising a copper conductor provided with a wrapping of high permeability alloy described and claimed in Patent No. 1,586,887, granted to G. W. Elmen on June 1, 1926, it has been found that the characteristic impedance at the frequencies of interest in cable work, is practically a constant resistance with only a small reactance. Therefore, the impedance terminating the sea earth conductor for the purpose of matching the impedance of the main cable beyond that point at which the interference from external sources becomes negligible, may be composed of pure resistance.

If the main cable conductor is now balanced by such a sea earth conductor and artificial line, the two terminals of the receiving apparatus will be subject to approximately equal variations of potentials as a result of currents induced in the main cable conductor and sea earth conductor from external sources, and such disturbances will have a negligible effect on a receiving instrument. In having the main cable conductor and the sea earth conductor close together or in the same sheath, a further advantage is had in that both conductors are subjected to the same temperature changes, and if the two are structurally similar they will be subjected to the same variations in electrical characteristics with the result that temperature variations will not impair the duplex balance, providing the artificial line is located sufficiently far out at sea that the cable beyond it is not subject to temperature changes, the temperature of the ocean bottom being substantially constant when a sufficient depth is reached.

To accomplish this advantage requires, of course, a submerged artificial line, but it has never been considered practicable to place the artificial line for a long submarine telegraph cable in a submerged container at sea in the manner required, since it would not, if so placed, be available for such adjustments as might be necessary, to obtain a perfect balance, or to match variations in the cable caused by repairs or changes with time. In Patent No. 1,567,316, granted to O. E. Buckley on December 29, 1925, there is disclosed means for adjusting the cable circuit from time to time by means of two additional artificial lines which are respectively connected, in parallel to the main cable conductor and the sea earth conductor, to the opposite ends of the duplex bridge and terminated in sea earth, the sea earth connections being established on the sheath enclosing the conductors. The artificial lines, thus arranged, are readily accessible and the cable circuit may be adjusted at any time to maintain the accuracy of balance required for duplex operation.

In the present invention the additional artificial lines are arranged as impedance arms in a Wheatstone bridge as hereinbefore stated, whereby they are connected in series with the main cable conductor and the sea earth conductor, respectively. In this arrangement none of the transmitted or received current is shunted to earth.

The invention will be more fully understood from a consideration of the accompanying drawing in which.

Figure 1:
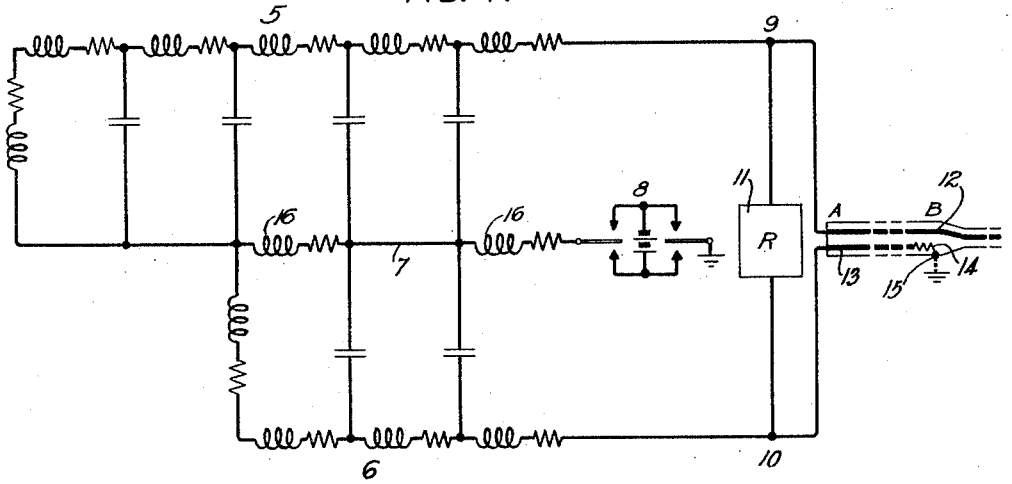
Fig. 1 represents one embodiment thereof applied to a cable arranged for duplex operation.

Referring to the drawing, the terminal apparatus comprises duplex equipment including the so-called ratio arms 5 and 6 which consist of balancing networks interconnected by a common conductor 7 which terminates in transmitting apparatus 8. Connected across the conjugate points 9 and 10 of the ratio arms is the receiving apparatus 11 and to these points are also connected a continuously loaded main cable conductor 12 to form one arm of the duplex bridge and a continuously loaded sea earth conductor 13 together with a submerged artificial line 14 and a sea earth connection 15 to form another arm. It will be noted that instead of connecting the artificial line directly to the receiving apparatus and making its ground connection to a sea earth conductor the artificial line is in this case connected to the distant end of the sea earth conductor with the result that the impedance to ground at any point on the sea earth conductor is the same as that from an adjacent point on the main cable conductor. Consequently, interfering currents induced from external sources will be neutralized as regards their effect on the receiving instrument 11. Furthermore, temperature changes affecting electrical characteristics of the main conductor between the points A and B will affect the corresponding part of the sea earth conductor in the same manner and to the same degree, and consequently have no effect on the accuracy of balance.

In order to differentiate herein between the artificial line 14 which has a fixed value and the networks which are employed in the ratio arms 5 and 6 and which are so arranged as to be adjusted from time to time to maintain a satisfactory balance for the cable system, the artificial line 14 will be referred to hereinafter as a terminating impedance and the networks 5 and 6 as the artificial lines.

If the main conductor and the sea earth conductor were exactly alike and if the terminating impedance 14 exactly balanced the cable 12 beyond the point B, no further adjustments would be necessary to insure proper functioning of the terminal apparatus, but it is practically impossible to insure an accurate balance between the two conductors 12 and 13 and between the terminating impedance and the cable 12 beyond the point B when the terminating impedance is located at sea where it is inaccessible. An artificial line comprising adjustable series resistances and inductances and shunt condensers is therefore provided in each of the ratio arms 5 and 6, so that the circuit may be adjusted from time to time to maintain the accuracy of balance required for duplex operation.

In order that there will be no disturbance in the receiving apparatus 11 while impulses are being sent by the transmitter 8, it is necessary that the potentials of points 9 and 10 be equally affected by the transmitted current. In order to accomplish this the first requirement is to have the impedance of the artificial lines in the ratio arms 5 and 6 in approximately the same ratio as impedances of the main cable conductor and the sea earth conductor respectively, and if there is still a source of disturbance owing to the failure of terminating impedance 14 to balance the main cable, this source of unbalance can be corrected by a change in either of the artificial lines. As a particular case, let us suppose that the resistance of the terminating impedance 14 is too large to balance the main cable 12. As a result the transmitted current will be reflected differently from the terminated impedance than from the cable beyond point B, establishing a difference of potential between points 9 and 10, and producing a disturbing current in the receiving apparatus 11. This disturbance may be eliminated by increasing the resistance in the artificial line of ratio arm 6 to such degree that the disturbance reflected therefrom will just compensate that reflected from the terminating impedance and the balance will therefore be restored. The same result might be accomplished by decreasing the resistance in the artificial line of ratio arm 5.

By arranging the artificial line so as to form in conjunction with the main cable conductor and the sea earth return conductor the arms of a Wheatstone bridge as shown in Fig. 1 of the drawing, it is desirable to build the artificial lines so as to simulate as closely as possible the physical characteristics of the main cable conductor and the sea earth conductor, respectively. In view of the close coupling between these conductors, it is particularly desirable to simulate this coupling by means of impedances 16 located at intervals in the conductor 7 which is common to the two artificial lines.

Figure 2:
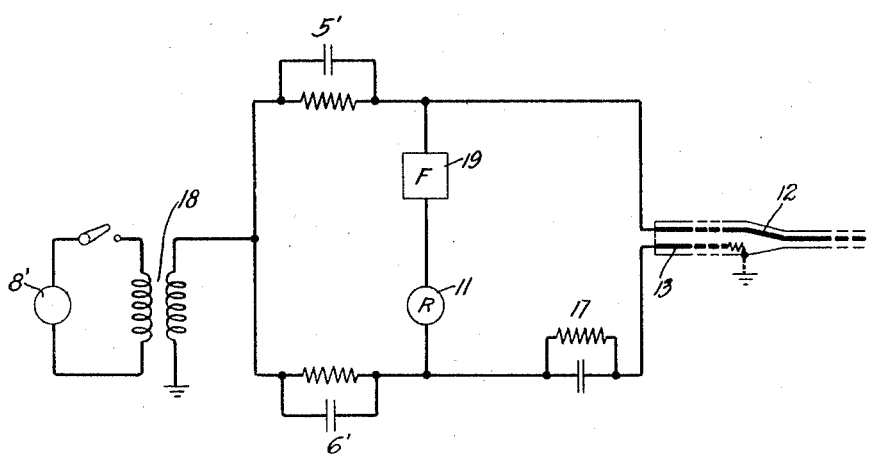
Fig. 2 is a simplified circuit of a duplex bridge system wherein an oscillator is provided to transmit an alternating current of a definite frequency.

In Fig. 2 is shown a cable circuit arranged for duplex operation and adapted for transmitting a modulated alternating current of a definite frequency, such as is used in carrier current transmission, this definite frequency being furnished by a source of constant frequency, such as an oscillator 8' and transformer 18. It is assumed that cable 12 is connected to a distant station (not shown) which is arranged to transmit direct current signals. In this case it is found advantageous to employ simple structures 5' and 6' consisting of resistance and capacity in parallel, which may be adjusted so as to obtain a balance in the bridge for frequencies in the neighborhood of the definite or carrier frequency. This balancing process can be facilitated by means of a network 17 connected in series with the sea earth conductor 13 as shown, or in series with the main cable conductor 12. Network 17 may also be connected in parallel with either of the conductors 12 and 13 to produce the same results. The effect of unbalance can be further reduced by means of filter 19 connected in series with the receiving apparatus 11. Filter 19 primarily serves as a low pass filter for receiving the direct current impulses transmitted from the distant station.

The sea earth conductor 13 is employed not only for the purpose of diminishing the effect of interference but also for balancing the effects produced in the conductor, arising from the non-linear magnetic characteristics of the loading material. It is necessary therefore that these effects in both the main cable conductor 12 and the sea earth conductor 13 be neutralized. This neutralization is accomplished by having the transmitted currents in the two conductors of the same sign at any instant so that these effects cancel rather than combine.

While the preceeding discussion has been confined for the most part to the case of a cable provided with a balanced type of sea earth it is obvious that the method will apply also to the case of any cable having a sea earth of impedance comparable with the impedance of the cable. For example, if the sea earth conductor is of great length, even though it is connected directly to earth at the sea end, its impedance will be large and the method of duplexing that has been described can be used to advantage.

What is claimed is:

1. In a submarine cable duplex signaling system, a Wheatstone bridge having for its impedance arms a signaling cable, a balanced sea earth return cable, and two artificial lines simulating said signaling cable and said sea earth return cable, respectively, and a mutual impedance connected between said artificial lines for balancing the coupling between said cables.

2. In a submarine cable duplex signaling system, a Wheatstone bridge having for its impedance arms a cable, a balanced sea earth return cable, and two artificial lines simulating said cable and said balance sea earth return cable, respectively, a conductor common to said artificial lines, and networks in said common conductor for balancing the coupling between said cable and said balanced sea earth return cable.

3. In a submarine cable duplex signaling system, a Wheatstone bridge having for its impedance arms a signaling cable, a balanced sea earth return cable and two artificial lines the impedances of which are in approximately the same ratio as the impedances of the signaling cable and the balanced sea earth return cable, respectively, and impedances connected between said artificial lines at regular intervals for balancing the coupling between said cables.

4. In a submarine cable duplex signaling system, a Wheatstone bridge having for its impedance arms a signaling cable, a balanced sea earth return cable and two artificial lines, said artificial lines each comprising a plurality of sections of series resistances and inductances and shunt condensers, a transmitting device, a metallic conductor having impedance mutual to the two artificial lines and connecting said transmitting device to said artificial lines, said conductor interconnecting said artificial lines section by section, and a receiving device bridging both said artificial lines and said cables.

5. A loaded duplex signaling system comprising a pair of conducting paths, a transmitter for signaling thereover, a receiver bridged across said paths, separate artificial lines simulating distributed capacity, resistance and inductance connected in series with each of said paths for balancing the system for duplex operation, said paths and said artificial lines each located in a separate arm of the duplex bridge, thereby forming in conjunction with said transmitter and said receiver a Wheatstone bridge arrangement, and impedances connected at regular intervals between said artificial lines for balancing the coupling between said conducting paths.

6. A continuously loaded signaling system comprising a pair of conducting paths, a transmitter for signaling thereover, a receiver bridged across said paths, separate artificial lines simulating distributed capacity, resistance and inductance and comprising a plurality of sections connected in series with said paths for balancing the system for duplex operation, a conductor connecting said transmitter to said artificial lines, said conductor interconnecting said artificial lines section by section, and impedances inserted at intervals along said conductor for balancing the mutual impedance between said paths.

In witness whereof, I hereunto subscribe my name this 15th day of December A. D. 1927.

JOHN J. GILBERT.